(12) United States Patent
Burton et al.

(10) Patent No.: US 9,311,931 B2
(45) Date of Patent: Apr. 12, 2016

(54) CONTEXT ASSISTED ADAPTIVE NOISE REDUCTION

(75) Inventors: Joe Burton, Los Gatos, CA (US); Cary Bran, Seattle, WA (US)

(73) Assignee: Plantronics, Inc., Santa Cruz, CA (US)

( * ) Notice: Subject to any disclaimer, the term of this patent is extended or adjusted under 35 U.S.C. 154(b) by 405 days.

(21) Appl. No.: 13/570,463

(22) Filed: Aug. 9, 2012

(65) Prior Publication Data

US 2014/0046659 A1  Feb. 13, 2014

(51) Int. Cl.
*G10L 21/00* (2013.01)
*G10L 25/48* (2013.01)
*G06Q 10/10* (2012.01)

(52) U.S. Cl.
CPC .............. *G10L 25/48* (2013.01); *G06Q 10/10* (2013.01)

(58) Field of Classification Search
CPC ................................ G10L 25/78; G10L 15/20
USPC ......................................... 704/226–228, 233
See application file for complete search history.

(56) References Cited

U.S. PATENT DOCUMENTS

| | | | |
|---|---|---|---|
| 7,933,771 B2* | 4/2011 | Chang et al. ................... | 704/233 |
| 8,515,089 B2* | 8/2013 | Nicholson ..................... | 381/71.6 |
| 8,965,005 B1* | 2/2015 | Gopalakrishnan et al. .. | 381/94.1 |
| 2004/0260547 A1* | 12/2004 | Cohen et al. .................. | 704/233 |
| 2007/0049255 A1* | 3/2007 | Bhakta et al. ............. | 455/412.2 |
| 2008/0159547 A1* | 7/2008 | Schuler et al. .................. | 381/56 |
| 2010/0008519 A1* | 1/2010 | Hayakawa et al. .......... | 381/94.1 |
| 2012/0052872 A1* | 3/2012 | Do .............................. | 455/456.1 |
| 2012/0185237 A1* | 7/2012 | Gajic et al. ........................ | 704/8 |
| 2012/0297304 A1* | 11/2012 | Maxwell ....................... | 715/728 |

* cited by examiner

*Primary Examiner* — Leonard Saint Cyr
(74) *Attorney, Agent, or Firm* — Chuang Intellectual Property Law (57) ABSTRACT

Methods and apparatuses for context assisted noise reduction are disclosed. In one example, noise data associated with background noise detected by a microphone at a mobile device is received. The noise data is processed to identify whether a threshold noise level has been exceeded. An event notification is transmitted, where the event notification is operable to initiate identifying a location having a reduced background noise.

23 Claims, 13 Drawing Sheets

| Room | Availability |
|---|---|
| 602 | Unavailable |
| 604 | Current Location |
| 606 | Unavailable |
| 608 | Available |

| | 902 | Room | Noise Level | 904 |
|---|---|---|---|---|
| | | 702 | Noisy | |
| | | 704 | Noisy | |
| | | 706 | Noisy | |
| | | 708 | Quiet | |

CONTEXT ASSISTED ADAPTIVE NOISE REDUCTION

BACKGROUND OF THE INVENTION

Voice communication devices utilizing microphones tend to pick up background noise. This background noise may include, for example, environmental noise such as other voices or sounds, system noise such as radiofrequency noise, and acoustic echo.

Background noise caused by other voices is often present if a person is trying to conduct a call in a collaborative workspace. Collaborative workspaces are commonplace for enterprises large and small. The typical collaborative workspace provides a high touch, high communication work environment free from the traditional boundaries of dedicated office space and high-rise cubicle walls. While having a high touch, population dense work environment is desirable for maximizing collaborative face-to-face communications, the open design of collaborative workspaces creates a noisy environment that hinders collaboration/communication between onsite and offsite (i.e., remote) team members.

To address background, noise, audio communication devices in the prior art typically utilize some form of noise reduction processing which attempts to reduce the detected background noise so that only the user voice is transmitted to the remote cad participant. While current noise reduction technology can help reduce the background noise, its effectiveness is limited. Furthermore, noise reduction processing benefits only the person on the other side of the call as the local call participant (i.e., the audio device user) must still conduct the call in the noisy environment. The audio device user currently has no way to know when the environmental noise conditions have exceeded the noise reduction capabilities of their device. Compounding the problem of not being able to detect when call quality has significantly diminished is what to do once the background environment noise levels have exceeded the noise reduction capabilities. Furthermore, in addition to the limitations of the device noise reduction capabilities, users have their on unique preferences for when background noise is sufficiently high to be overly bothersome when conducting a call.

As a result, improved methods and apparatuses for addressing background noise during audio communications are needed.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Methods and apparatuses for context assisted noise reduction are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein.

Block diagrams of example systems are illustrated and described for purposes of explanation. The functionality that is described as being performed by a single system component may be performed by multiple components. Similarly, a single component may be configured to perform functionality that is described as being performed by multiple components. For purpose of clarity, details relating to technical material that is known in the technical fields related to the invention have not been described in detail so as not to unnecessarily obscure the present invention. It is to be understood that various example of the invention, although different, are not necessarily mutually exclusive. Thus, a particular feature, characteristic, or structure described in one example embodiment may be included within other embodiments.

In one example, a computer implemented method includes receiving a noise data associated with background noise detected by a microphone at a mobile device. The noise data is processed to identify whether a threshold noise level has been exceeded. For example, the threshold noise level corresponds to a noise reduction failure threshold level of the mobile device or a user preference noise level. The method includes transmitting an event notification, where the event notification is operable to initiate identifying a location having a reduced background noise.

In one example, a computer readable storage memory stores instructions that when executed by a computer cause the computer to perform a method including receiving a noise data associated with background noise detected by a microphone at a mobile device. The noise data is processed to identify whether a threshold noise level has been exceeded. For example, the threshold noise level corresponds to a noise reduction failure threshold level of the mobile device or a user preference noise level. The method includes transmitting an event notification, where the event notification is operable to initiate identifying a location having a reduced background noise. The stored instructions executed by the computer may be stored on one or more computer readable storage memory.

In one example, a computer readable storage memory stores instructions that when executed by a computer cause the computer to perform a method including receiving an event notification indicating a threshold noise level has been exceeded, and identifying a location having a reduced noise. The stored instructions executed by the computer may be stored on one or more computer readable storage memory.

In one example, a computer implemented method includes receiving an event notification indicating a threshold noise level has been exceeded. A location having a reduced noise is identified.

In one example, an audio device includes a microphone operable to detect user speech and background noise, a speaker, a network interface, and a processor. The audio device further includes a memory storing an application executable on the processor configured to process the background noise to identify whether a noise level threshold has been exceeded, where the application is further configured to output a noise level message to an audio device user. For example, the noise level threshold corresponds to a noise reduction failure threshold level or a user preference level. The noise level message informs the device user that the noise reduction failure threshold level or user preference level has been exceeded.

In one example, a method includes receiving a noise data associated with background noise detected by a microphone at a mobile device. The noise data is processed to identify whether a threshold noise level has been exceeded. For example, the threshold noise level corresponds to a noise reduction failure threshold level of the mobile device or a user preference noise level. The method includes identifying a location having a reduced background noise. The method may be performed by a processor executing stored instructions on a computer readable memory.

In one example, a system includes a wearable device and a contextual noise reduction system (CNRS). The wearable device may, for example, be a headset. In one implementation, the wearable device includes a dedicated microphone for picking up environmental noise, a mechanism for configuring noise reduction failure threshold limits, a mechanism for propagating events when noise reduction thresholds have been exceeded, and a mechanism for playing voice prompts. The contextual noise reduction system processes and handles device events. In one implementation, the contextual noise reduction system (1) receives and processes wearable device events, (2) sends notifications to the user (e.g., output as audio whisper notifications or text based notifications), (3) receives and processes natural speech commands from the user, (4) communicates with backend services to determine user location, quiet room or location scheduling, (5) determines quiet locations within proximity of the user, and (6) reserves quiet locations on behalf of the user.

In one example usage scenario, a local user utilizing a wearable device (e.g., a headset) is on a call with a far end call participant. The headset dedicated background noise microphone takes periodic samples of the background noise levels. The sampling rate of the background noise level is configurable to better preserve battery life. Background noise levels begin to increase due to the presence of people in the vicinity of the local device user. As noise levels rise, the headset increases the sampling rate and compares the samples with the configured noise reduction failure threshold. When the noise reduction failure threshold has been reached or exceeded for a configured amount of time, the headset will begin to send notification events to the contextual noise reduction system.

In one usage example, the contextual noise reduction system (CNRS) receives the noise reduction failure notification events from the headset and the following flow of events occurs:

1. The CNRS queries a location service for the local user's current location.
2. The CNRS queries the location service for a list of meeting rooms that are within close proximity to the local user's location. In an alternate embodiment, the CNRS receives data from a microphone array that has been integrated throughout the building. The microphone array can inform the CNRS where the "noisy" and "quiet" locations are within the array. For example the microphone array could detect that the lobby of a first building was quiet, while the cafeteria of a second building was noisy.
3. The CNRS negotiates with the room scheduler to book a vacant room for the local user to move to. In an alternate embodiment, the CNRS determines the best location based upon the input from the campus wide microphone array. The location may not be a meeting room or dedicated space, it may be a hallway or common area that cannot be hooked.
4. The CNRS whispers audio into the headset that the background noise is exceeding the audio quality threshold. Alternately, the CNRS may send a text message to a device associated with the headset, such as a mobile phone or PC, which is displayed on the device.
5. The CNRS prompts the local user to answer "yes" or "no" if he would like to move his call to a quieter location.
6. The local user whispers "yes" into the headset.
7. The CNRS uses the speech recognition engine to determine the local user's response. The speech recognition may be performed at the headset or other device such as a mobile phone or PC.
8. The CNRS sends a message to book the room provided by the room scheduler.
9. The CNRS whispers into the headset the room name that it has reserved for the local user's call. In an alternative embodiment, the CNRS could suggest that the local user move to a particular area within a building—e.g. "the lobby" or "the cafeteria".
10. The local user leaves his current location and walks to the quiet room.
11. The headset sends a notification to the CNRS that the noise levels are now acceptable.

Figure 1:
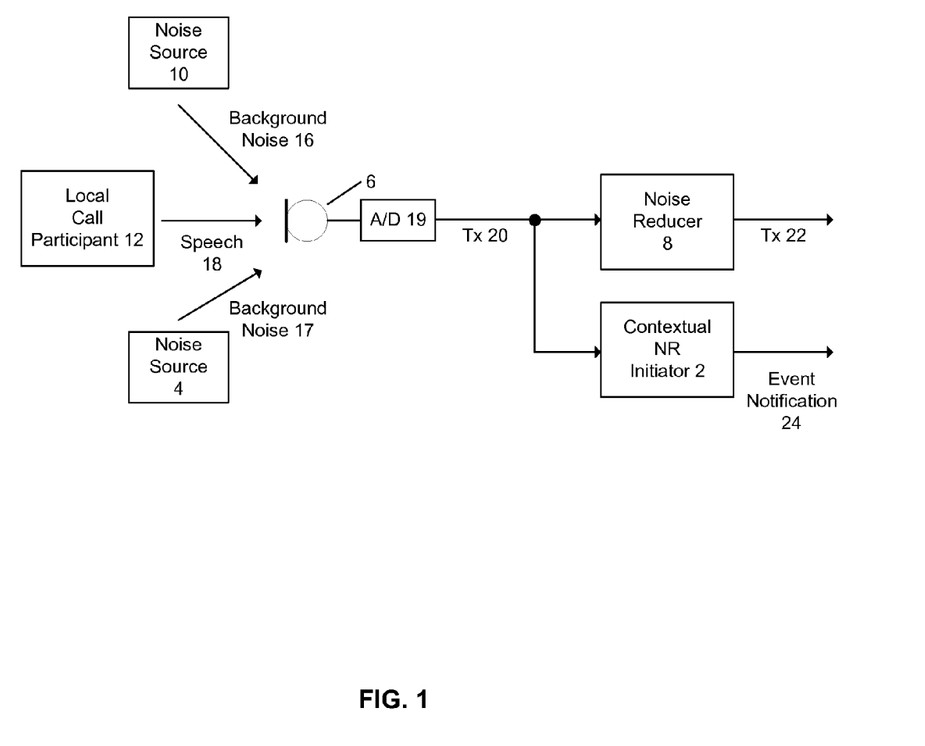
FIG. 1 illustrates a system for noise reduction in one example.

FIG. 1 illustrates a system for noise reduction in one example. The system includes a microphone 6, noise reducer 8, and contextual noise reduction initiator (CNRI) 2. Although only a single microphone 6 is illustrated, in a further example an array of two or more microphones may be used. Microphone 6 is coupled to an analog-to-digital (A/D) converter 19.

In the example shown in FIG. 1 microphone 6 detects the speech 18 of a local call participant 12. Microphone 6 also detects background noise 16 from a noise source 10 and background noise 17 from a noise source 4. The analog signal output from microphone 6 is input to A/D converter 19 to form a digital transmit signal (Tx) 20. Tx signal 20 includes several signal components, including user speech 18, background noise 16, and background noise 17. Tx signal 20 is input to both noise reducer 8 and contextual noise reduction initiator 2 for processing.

Noise reducer 8 processes transmit signal (Tx) 20 to remove background noise utilizing a noise reduction algorithm. Noise reducer 8 may comprise any combination of several noise reduction techniques known in the art. Each noise reduction technique may address different noise artifacts present in the voice and noise signal. Such techniques may include, but are not limited to noise subtraction, spectral subtraction, dynamic gain control, and independent component analysis. Noise reducer 8 outputs a transmit signal 22 having reduced noise which is to be transmitted to a far end call participant.

In noise subtraction, the noise source signal components are processed and subtracted from Tx signal 20. For example, these techniques may include Widrow-Hoff style noise subtraction techniques where the voice amplitude and the noise amplitude are adaptively adjusted to minimize the combination of the output noise and the voice aberrations.

In spectral subtraction, the voice and noise components of Tx signal 20 are decomposed into their separate frequency components and adaptively subtracted on a weighted basis. The weighting may be calculated in an adaptive fashion using an adaptive feedback loop.

Noise reducer 8 has a noise reduction failure threshold whereby the noise reduction algorithms fail or the audio quality becomes unacceptable if the background noise level exceeds the noise reduction failure threshold. In one example, the noise reduction failure threshold is preconfigured at the manufacturer. Contextual noise reduction initiator 2 processes Tx signal 20 to identify whether a noise reduction failure threshold of noise reducer 8 has been exceeded. If the noise reduction failure threshold has been exceeded, contextual noise reduction initiator 2 transmits an event notification 24, where the event notification 24 is operable to initiate identifying a location having a reduced background noise.

Figure 2:
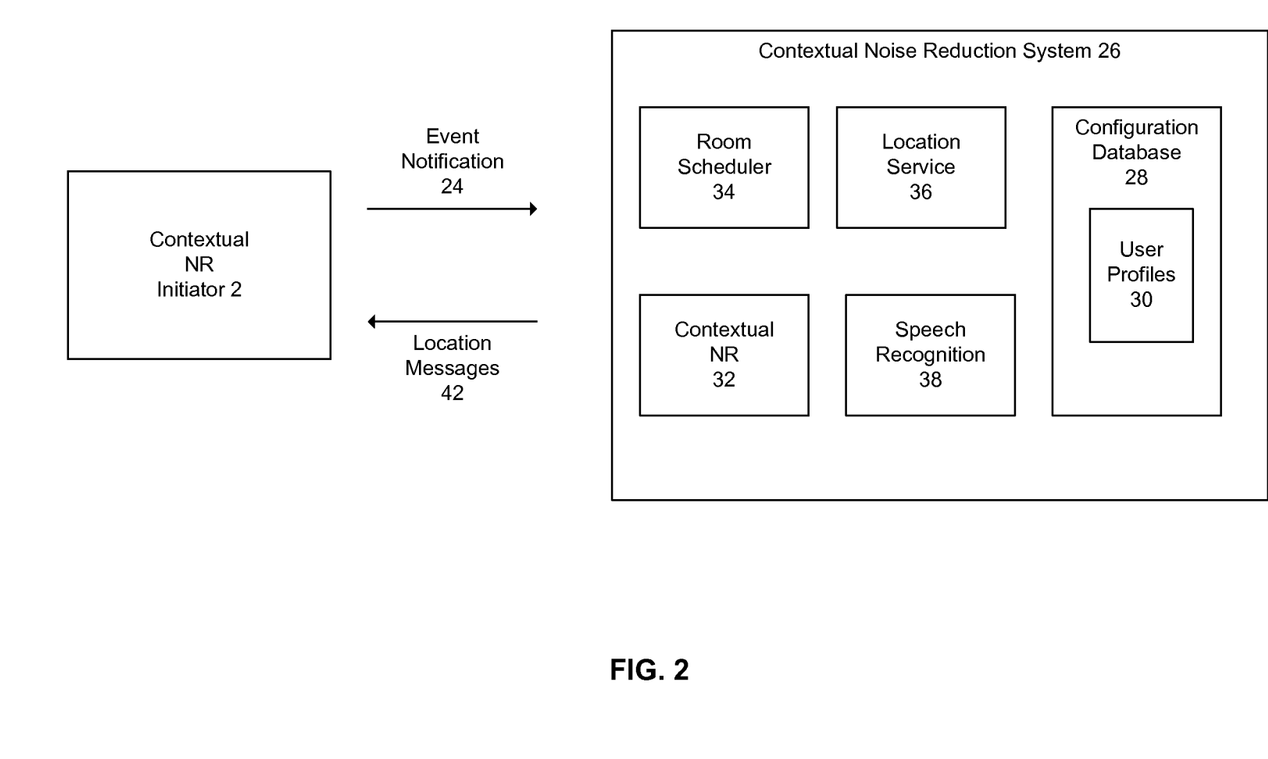
FIG. 2 illustrates a system for noise reduction in a further example.

FIG. 2 illustrates a system for noise reduction in a further example. The system includes a contextual noise reduction initiator 2 and a contextual noise reduction system (CNRS) 26. In this example, CNRS 26 includes a configuration database 28 storing user profiles 30, a room scheduler 34, a location service 36, a speech recognition module 38, and a contextual noise reduction application 32. Contextual noise reduction application 32 interfaces with contextual noise reduction initiator 2, configuration database 28, room scheduler 34, location service 36, and speech recognition module 38 to implement the processes and functionality described herein.

Contextual noise reduction initiator 2 transmits an event notification 24 if a noise reduction failure threshold has been exceeded which is received by contextual noise reduction application 32 at CNRS 26. Upon receiving event notification 24, contextual noise reduction application 32 identifies a location having reduced noise. For example, contextual noise reduction application 32 locates an available meeting room and reserves the meeting room using room scheduler 34.

In one example, contextual noise reduction application 32 identifies a current location of a user where the noise reduction failure threshold has been exceeded using location service 36 and then identifies an alternate location having a reduced noise proximate to the current location. For example, contextual noise reduction application 32 may receive location data from the user mobile device in order to identify the user's current location. In one example, contextual noise reduction application 32 may determine the user's current location from a network address associated with the user mobile device. An alternate location having a reduced noise may be located by receiving data from a plurality of microphones dispersed throughout a floor plan as described below in reference to FIG. 7 and FIG. 9. Location service 36 may determine user location using a variety of techniques, including global positioning system data, access point or internet protocol addresses, or location, beacon sensors distributed throughout possible user locations.

Contextual noise reduction initiator 2 may be implemented on a variety of mobile devices, in one example, upon detection of a failure or decrease in effectiveness of the mobile device noise reducer, the contextual noise reduction initiator 2 outputs a message indicating a noise reduction failure to the mobile device user. A user input is received at the mobile device user interface, the user input operable to initiate transmitting the event notification 24. Referring again to FIG. 2, contextual noise reduction initiator 2 receives location messages 42 from CNRS 26 indicating locations having reduced noise. Contextual noise reduction initiator 2 outputs location messages 42 at the mobile device user interface so that the user can move to the alternate location. Once the user has moved to the alternate location, contextual noise reduction initiator 2 transmits an update event notification that a new noise data indicates a noise level is below a noise reduction failure threshold.

In one example, contextual noise reduction initiator 2 processes Tx signal 20 to identify whether the background noise level exceeds a user preference noise level threshold. The user preference noise level threshold may be independent of the noise reduction failure threshold and is based on a user indicated preference of when background noise is excessive beyond a desirable level such that the user wishes to be informed of an alternate location having reduced noise. In this example, if the user preference noise level threshold is exceeded, an event notification 24 operable as described above is sent to CNRS 26. In one example, user preference noise level thresholds specific to different users are stored in user profiles 30 at configuration database 28 or at the mobile device.

CNRS 26 may be a distributed system. Components of CNRS 26 may be implemented on a single host device or across several devices, including cloud based implementations. Example devices include mobile phones, personal computers, and network servers.

Figure 3:
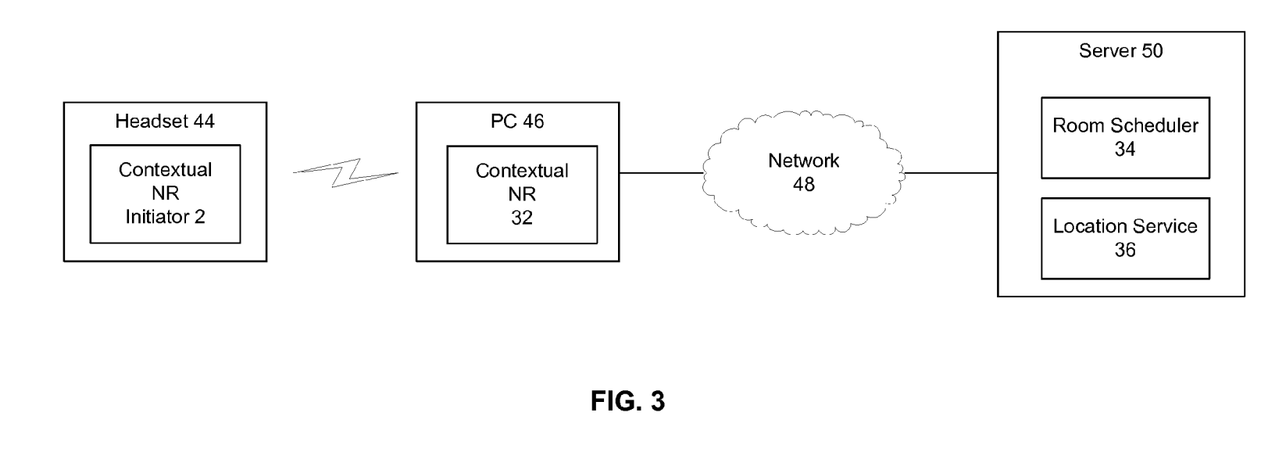
FIG. 3 illustrates an example implementation of the system for noise reduction shown in FIG. 2.

FIG. 3 illustrates an example implementation of the system for noise reduction shown in FIG 2. In this implementation, contextual noise reduction initiator 2 is an application disposed at and executable on headset 44, contextual noise reduction application 32 is disposed at a personal computer (PC) 46, and room scheduler 34 and location service 36 are disposed at a server 50. PC 46 is connectable to server 50 via a network 48. For example, network 48 may be an Internet Protocol (IP) network. Personal computer 46 may, for example, be a notebook computer, desktop computer, or PDA type device. In addition to contextual noise reduction application 32, PC 46 executes a VoIP application (also referred to herein as a "VoIP telephone" or a "softphone") allowing a user to conduct telephone calls using headset 44.

Figure 4:
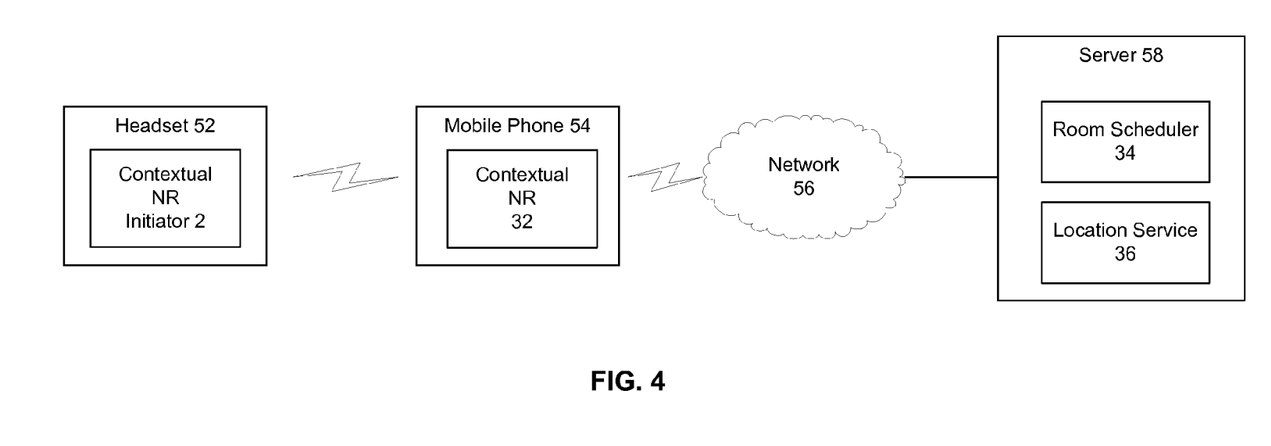
FIG. 4 illustrates a further example implementation of the system for noise reduction shown in FIG. 2.

FIG. 4 illustrates a further example implementation of the system for noise reduction shown in FIG. 2. In this implementation, contextual noise reduction initiator 2 is disposed at a headset 52, contextual noise reduction application 32 is disposed at a mobile phone 54, and room scheduler 34 and location service 36 are disposed at a server 58. Mobile phone 54 is connectable to server 58 via a network 56. For example, network 56 may include a cellular communications network and an Internet Protocol (IP) network. The headset 52 and mobile phone 54 may utilize a wireless link such as Bluetooth so that the user can conduct calls using headset 52 with mobile phone 54 over a cellular communications or other network.

Figure 5:
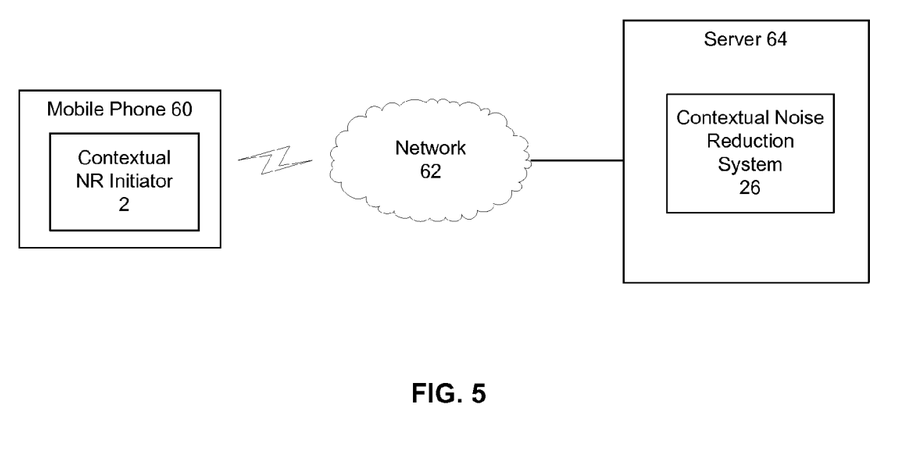
FIG. 5 illustrates a further example implementation of the system for noise reduction shown in FIG. 2.

FIG. 5 illustrates a further example implementation of the system for noise reduction shown in FIG. 2. In this implementation, contextual noise reduction initiator 2 is disposed at a mobile phone 60, and CNRS 26 is disposed at a server 64. Mobile phone 54 is connectible to server 64 via a network 62, and the user conducts call with mobile phone 54. For example, network 62 may include a cellular communications network and an Internet Protocol (IP) network.

Figure 6:
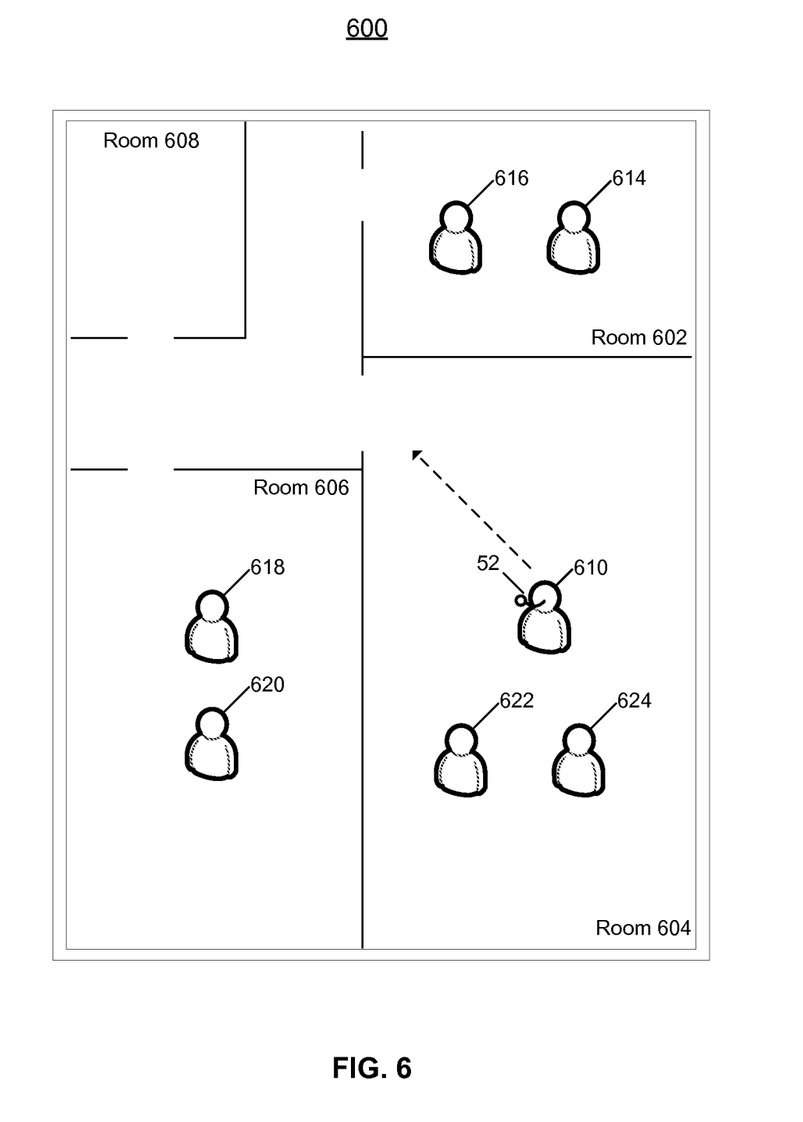
FIG. 6 illustrates a floor plan in a usage example of a system for noise reduction.
Figure 8:
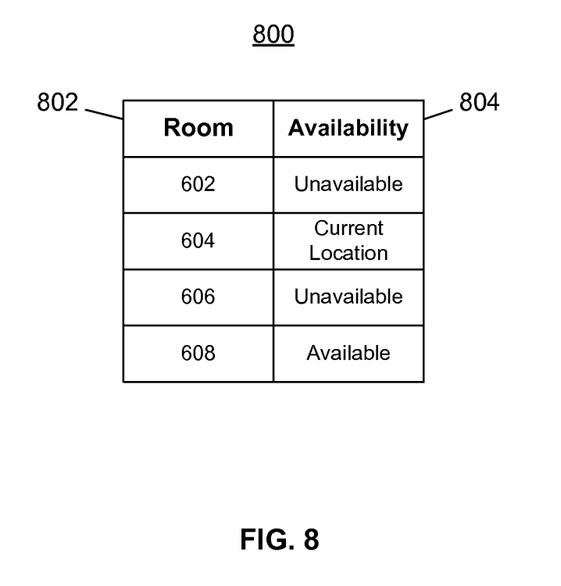
FIG. 8 illustrates a lookup table utilized by a room scheduler application showing availability of rooms in the floor plan shown in FIG. 6.

FIG. 6 illustrates a floor plan 600 in a usage example of a system for noise reduction. Floor plan 600 includes a room 602, a room 604, a room 606, and a room 608. For example, where floor plan 600 corresponds to the office of a user 610, rooms 602, 606, and 608 are meeting rooms which may be reserved by a room scheduler application. Room 604 may be a cubicle area, hallway, or other open area. In the example shown in FIG. 6, a user 610 is conducting a call using a headset 52 in a room 604. Inside room 602 are employee 614 and employee 616. Inside room 606 are employee 618 and employee 620. Room 608 is empty and unreserved. FIG. 8 illustrates a lookup table 800 utilized by a room scheduler application showing availability of rooms in the floor plan shown in FIG. 6. Table 800 includes a column 802 of rooms and a column 804 indicating their availability. In the current example, only room 608 is available.

In one illustrative example, employees 622 and 624 are conducting a conversation in room 604. Headset 52 executing contextual noise reduction initiator 2 as shown in FIG. 4 detects that a noise reduction failure threshold or user preference noise threshold had been exceeded. Headset 52 prompts the user 610 whether the user 610 wishes to move to a location with reduced noise. In one example, the user is prompted with an audio message output at the headset speaker and the user responds verbally with a "yes" or "no" processed by a speech recognition unit. If user 610 responds affirmatively, contextual noise reduction application 32 identifies that room 608 is available and reserves room 608 using room scheduler 34. Contextual noise reduction application 32 sends a location message to headset 52 which is output to the user informing user 610 that room 608 has been reserved. User 610 in his user profile at the configuration database may indicate that the closes available unreserved room should be automatically reserved and the user 610 automatically informed upon the occurrence that a noise reduction failure threshold or user preference noise threshold had been exceeded.

Figure 7:
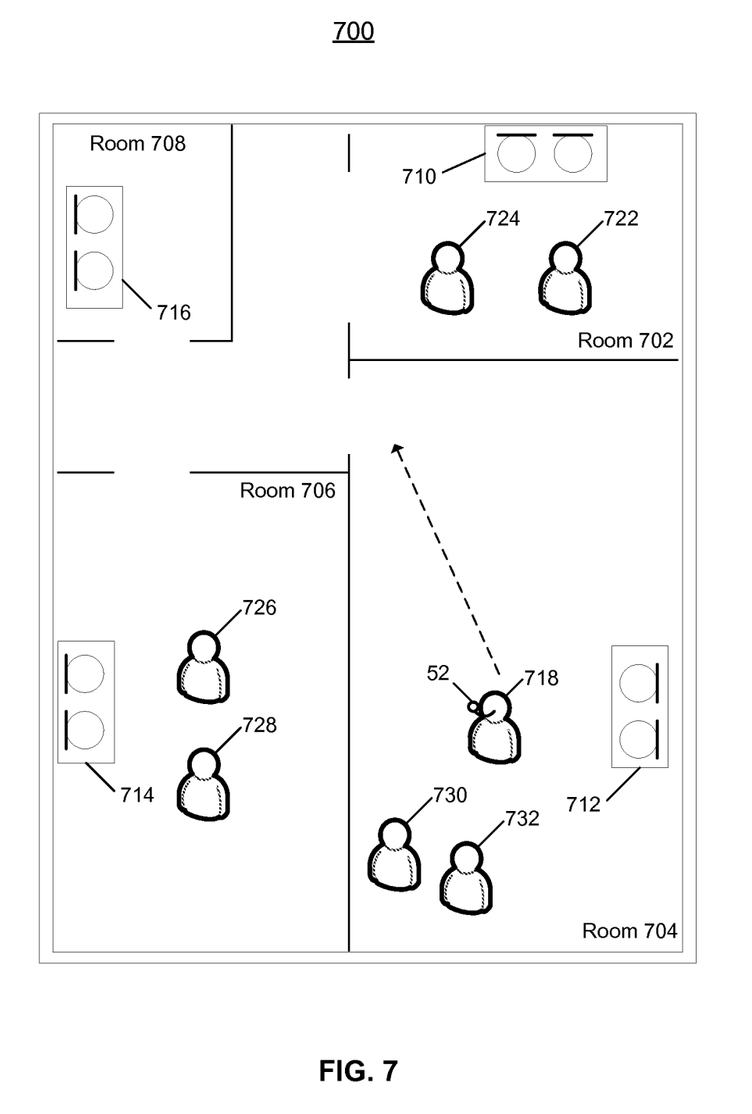
FIG. 7 illustrates a floor plan in a further usage example of a system for noise reduction.

FIG. 7 illustrates a floor plan in a further usage example of a system for noise reduction. Floor plan 700 includes a room 702, a room 704, a room 706, and a room 708. Rooms 702, 704, 706, and 708 each include one or microphones operable to detect the noise level in each room. For example, room 702 includes a microphone array 710, room 704 includes a microphone array 712, room 706 includes a microphone array 714, and room 708 includes a microphone array 716.

Figure 9:
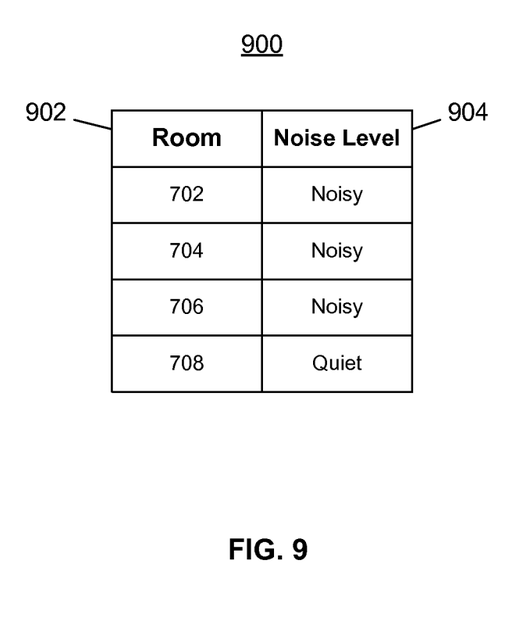
FIG. 9 illustrates a lookup table showing detected noise levels in the rooms in the floor plan shown in FIG. 7.

In the example shown in FIG. 7, a user 718 is conducting a call using a headset 52 in a room 704. Inside room 702 are employee 722 and employee 724 in conversation. Inside room 706 are employee 726 and employee 728 in conversation. Next to user 718 m room 704 are employee 730 and employee 732 in conversation. Room 708 is empty. FIG. 9 illustrates a lookup table showing detected noise levels in the rooms in the floor plan shown in FIG. 7 based on the location and detected conversations of the employees 722, 724, 726, 728, 730, and 732.

In one illustrative example, employees 730 and 732 are conducting a conversation in room 704. Headset 52 executing contextual noise reduction initiator 2 as shown in FIG. 4 detects that a noise reduction failure threshold or user preference noise threshold had been exceeded. Headset 52 prompts the user 718 whether the user 718 wishes to move to a location with reduced noise. If user 718 responds affirmatively, contextual noise reduction application 32 identifies that room 708 has reduced or no noise utilizing table 900. Contextual noise reduction application 32 sends a location message to headset 52 which is output to the user informing user 610 that room 708 has reduced noise.

Figure 10:
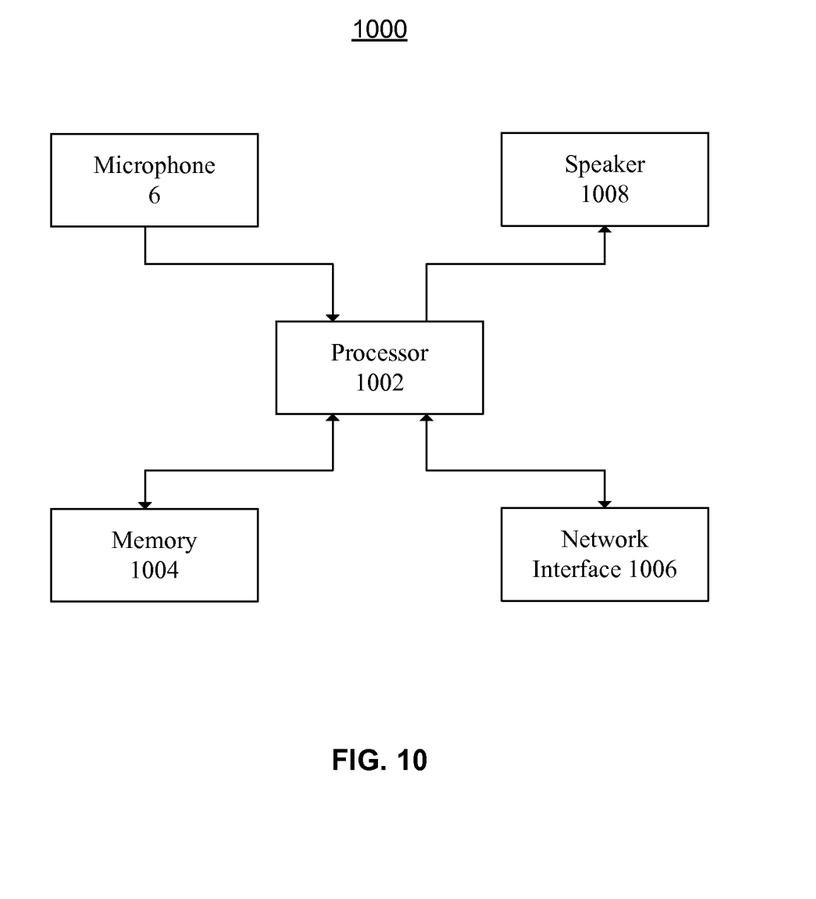
FIG. 10 illustrates an audio device in one example configured to implement one or more of the examples described herein.

FIG. 10 illustrates an audio device 1000 in one example configured to implement one or more of the examples described herein. Examples of audio device 1000 include mobile phones, headsets, desktop phones, and personal computers. For example, headset 44 shown in FIG. 3, headset 52 shown in FIG. 4, or mobile phone 60 shown in FIG. 5 may be implemented with audio device 1000.

In one example, an audio device 1000 includes a microphone 6, a speaker 1008, a memory 1004, and a network interface 1006 operable to receive a receive audio signal to be output at the speaker and transmit a transmit audio signal to a call participant. Audio device 1000 includes a digital-to-analog converter (D/A) coupled to a speaker 1008 and an analog-to-digital converter (A/D) coupled to microphone 6. In one example, the network interface 1006 is a wireless transceiver or a wired network interface.

Memory 1004 represents an article that is computer readable. For example, memory 1004 may be any one or more of the following: random access memory (RAM), read only memory (ROM), flash memory, CDROM, a hard disk, or any other type of article that includes a medium readable by processor 1002. Memory 1004 can store computer readable instructions for performing the execution of the various method embodiments of the present invention. In one example, the processor executable computer readable instructions are configured to perform a process such as that shown in FIG. 13 or FIG. 14. Computer readable instructions may be loaded in memory 1004 for execution by processor 1002. In one example, processor 1002 implements an operation that detects undesirably excessive background noise levels and initiates a process by which a location with reduced noise is located and provided to a user of audio device 1000.

Network interface 1006 allows device 1000 to communicate with other devices. Network interface 1006 may include a wired connection or a wireless connection. Network interface 1006 may include, but is not limited to, a wireless transceiver, a modem, a Network Interface Card (NIC), an integrated network interface, a radio frequency transmitter/receiver, a USB connection, or other interfaces for connecting computing device 1000 to a telecommunications network such as a cellular network, the PSTN, or an IP network.

In one example, the audio device 1000 includes a processor 1002 configured to receiving a noise data associated with background noise detected by a microphone at a mobile device. The noise data is processed to identify whether a certain noise level has been exceeded. For the example, the noise level may correspond to a noise reduction failure threshold level of the mobile device or a user preference noise level threshold. A noise reduction failure message is output to the audio device 1000 user. In one example, the processor is further configured to identify an alternate location having a reduced background noise. In one example, an event notification is transmitted, where the event notification is operable to initiate identifying a location having a reduced background noise. The event notification may be transmitted responsive to a user action at a user interface of device 1000. The processor may be configured to receive a message containing an alternate location having a reduced background noise and output the message to the audio device 1000 user. The alternate location may be output as a voice prompt using a voice prompt unit or as a text based message.

In one example, the audio device includes 1000 includes a processor 1002 configured to receive or process an event notification indicating a noise level has been exceeded, and identify a location having a reduced noise.

Figure 11:
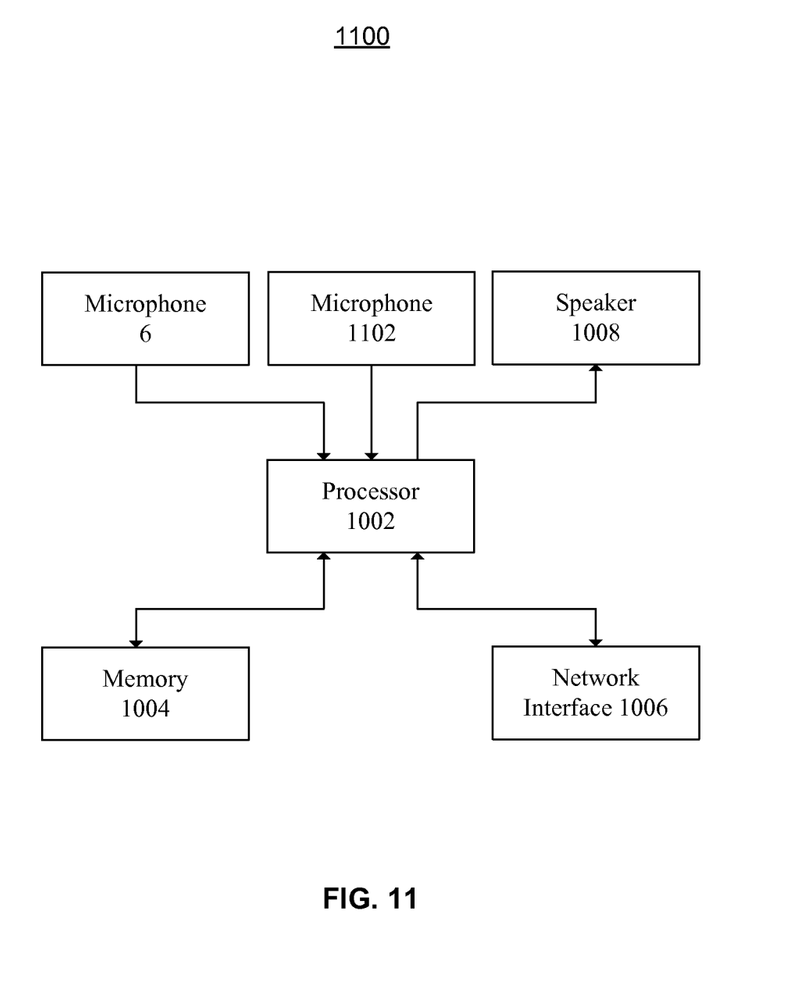
FIG. 11 illustrates an audio device in a further example configured to implement one or more of the examples described herein.
Figure 12:
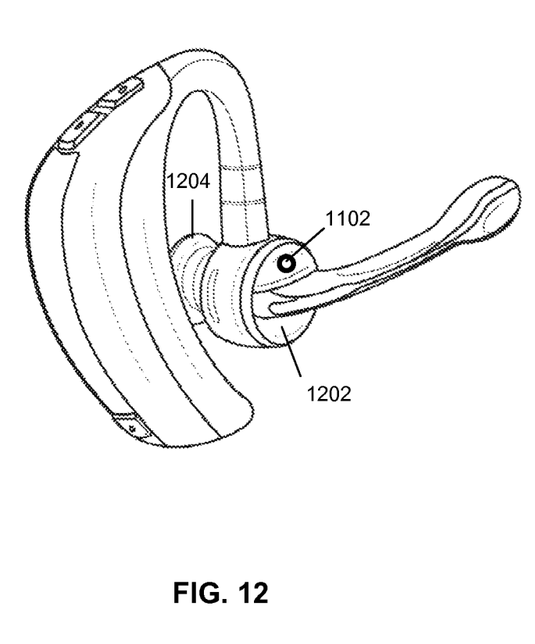
FIG. 12 illustrates a perspective view of a headset embodiment of audio device shown in FIG. 11.

FIG. 11 illustrates an audio device 1100 in a further example configured to implement one or more of the examples described herein. Audio device 1100 is substantially similar to audio device 1000 in FIG. 10 except that audio device 1100 includes a second microphone 1102 dedicated to and optimized to detect background noise. For example, microphone 1102 is placed on the device 1100 in a position so that detection of a user voice is minimized while detection of background noise is maximized. FIG. 12 illustrates a perspective view of a headset embodiment of audio device 1100 shown in FIG. 11. In the example shown in FIG. 12, a microphone 1102 is placed on an outer side 1202 of the headset housing opposite the headset earbud 1204. Microphone 6 is placed in the typical position at the end of the headset boom.

In a further example, audio device 1000 and audio device 1100 may be a distributed system. For example, several devices may be in communication by way of a network connection to collectively perform tasks described as being performed by the audio device 1000 or audio device 1100.

Figure 13:
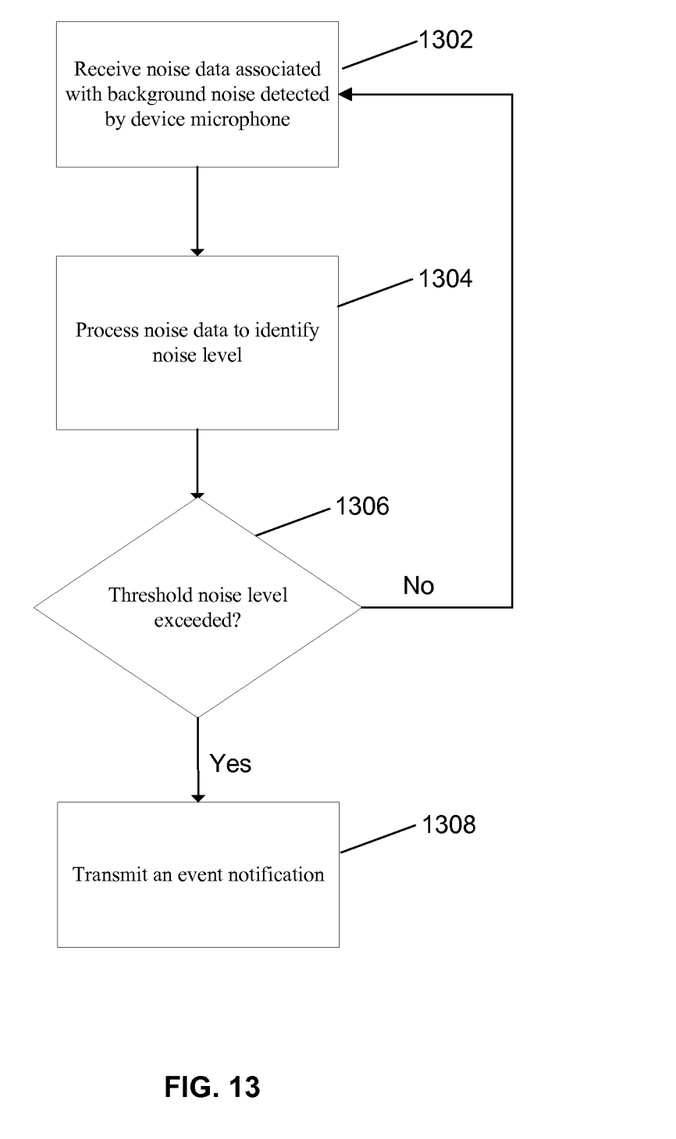
FIG. 13 is a flow diagram illustrating processing of background noise detected by an audio device.

FIG. 13 is a flow diagram illustrating processing of background noise detected by an audio device. At block 1302, noise data associated with background noise detected by a microphone at a mobile device is received. At block 1304, the noise data is processed to identify the background noise level.

At decision block 1306, if it is determined whether a threshold noise level has been exceeded. In one example, the threshold noise level corresponds to a noise reduction failure threshold level of the mobile device, in one example, the threshold noise level corresponds to a user preference level. A message indicating a noise reduction failure threshold or user preference level may be output to the mobile device user.

If no at decision block 1306, the process returns to block 1302. If yes at decision block 1306, at block 1308 an event notification is transmitted. In one example, the process further includes receiving a user input at the mobile device, the user input operable to initiate transmitting the event notification. In one example, the event notification is operable to initiate identifying a location having a reduced background noise. In one example, the process farther includes receiving a message including the location and outputting the message at a mobile device user interface. In one example, the process further includes transmitting an update event notification that a new noise data indicates a noise level is below a noise reduction failure threshold.

Figure 14:
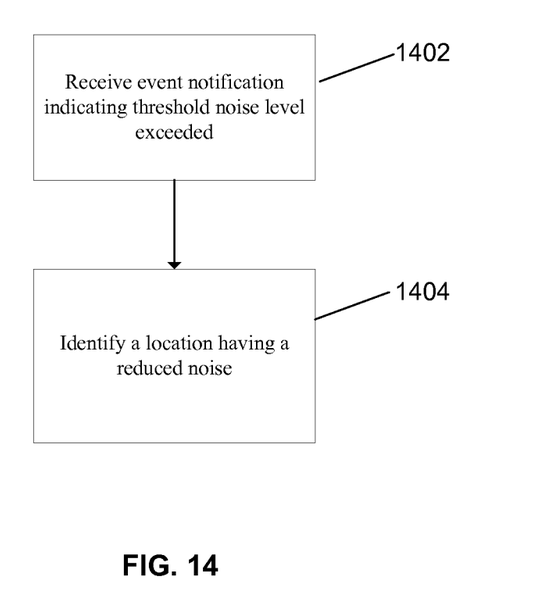
FIG. 14 is a flow diagram illustrating processing of event notifications indicating a threshold noise level has been exceeded.

FIG. 14 is a flow diagram illustrating processing of event notifications indicating a noise level threshold has been exceeded. At block 1402, an event notification is received indicating a threshold noise level has been exceeded. In one example, the threshold noise level corresponds to a noise reduction failure threshold level, in one example, the threshold noise level corresponds to a user preference noise level.

At block 1404, a location having a reduced noise is identified. In one example, identifying a location having a reduced noise includes locating an available meeting room and reserving the meeting room. In a further example, identifying a location having a reduced noise includes identifying a current location of a user, and identifying an alternate location having a reduced noise proximate to the current location. For example, identifying a current location of the user may include receiving location data from a user mobile device or receiving a network address associated with the user mobile device, identifying an alternate location having a reduced noise proximate to the current location may include receiving data from a plurality of microphones distributed at several locations or identifying an unreserved meeting room. In one example, once the alternate location, is identified, the call is transferred from the user's current phone to a phone located at the alternate location.

While the exemplary embodiments of the present invention are described and illustrated herein, it will be appreciated that they are merely illustrative and that modifications can be made to these embodiments without departing from the spirit and scope of the invention. Acts described herein may be computer readable and executable instructions that can be implemented by one or more processors and stored on a computer readable memory or articles. The computer readable and executable instructions may include, for example, application programs, program modules, routines and subroutines, a thread of execution, and the like. In some instances, not all acts may be required to be implemented in a methodology described herein.

Terms such as "component" and "system" are intended to encompass software, hardware, or a combination of software and hardware. For example, a system or component may be a process, a process executing on a processor, or a processor. Furthermore, a functionality, component or system may be localized, on a single device or distributed across several devices. The described subject matter may be implemented as an apparatus, a method, or article of manufacture using standard programming or engineering techniques to produce software, firmware, hardware, or any combination thereof to control one or more computing devices.

Thus, the scope of the invention is intended to be defined only in terms of the following claims as may be amended, with each claim being expressly incorporated into this Description of Specific Embodiments as an embodiment of the invention.

What is claimed is:

1. One or more non-transitory computer-readable storage media having computer-executable instructions stored thereon which, when executed by one or more computers, cause the one more computers to perform operations comprising:
   receiving a noise data associated with background noise detected by a microphone at a mobile device;
   processing the noise data to identify that a threshold noise level has been exceeded;
   transmitting an event notification responsive to an identification the threshold noise level has been exceeded, the event notification operable to initiate identifying and reserving a location having a reduced background noise, the location comprising a meeting room; and
   outputting a message comprising the location comprising the meeting room at a user interface of the mobile device.

2. The one or more non-transitory computer-readable storage media of claim 1, wherein the threshold noise level corresponds to a noise reduction failure threshold level of the mobile device.

3. The one or more non-transitory computer-readable storage media of claim 2, the operations further comprising outputting a message indicating a noise reduction failure to a mobile device user.

4. The one or more non-transitory computer-readable storage media of claim 1, wherein the threshold noise level corresponds to a user preference level.

5. The one or more non-transitory computer-readable storage media of claim 1, the operations further comprising receiving a user input at the mobile device, the user input operable to initiate transmitting the event notification.

6. The one or more non-transitory computer-readable storage media of claim 1, the operations further comprising receiving at the mobile device from a second device the message comprising the location having the reduced background noise.

7. The one or more non-transitory computer-readable storage media of claim 1, the operations further comprising transmitting an update event notification that a new noise data indicates a noise level is below a noise reduction failure threshold.

8. One or more non-transitory computer-readable storage media having computer-executable instructions stored thereon which, when executed by one or more computers, cause the one more computers to perform operations comprising:
   receiving a plurality of microphone data from a plurality of stationary microphones integrated into a building structure;
   receiving an event notification from a mobile device indicating a threshold noise level has been exceeded;
   identifying responsive to the event notification a location having a reduced noise utilizing the plurality of microphone data from the plurality of stationary microphones integrated into the building structure; and
   outputting at a device user interface the location having the reduced noise.

9. The one or more non-transitory computer-readable storage media of claim 8, wherein the threshold noise level corresponds to a noise reduction failure threshold level.

10. The one or more non-transitory computer-readable storage media of claim 8, wherein the threshold noise level corresponds to a user preference noise level.

11. The one or more non-transitory computer-readable storage media of claim 8, wherein identifying responsive to the event notification the location having a reduced noise comprises locating an available meeting room.

12. The one or more non-transitory computer-readable storage media of claim 11, the operations further comprising reserving the available meeting room.

13. The one or more non-transitory computer-readable storage media of claim 8, wherein identifying responsive to the event notification the location having a reduced noise comprises:
   identifying a current location of a user; and
   identifying an alternate location having a reduced noise proximate to the current location.

14. The one or more non-transitory computer-readable storage media of claim 13, wherein identifying a current location of the user comprises:
   receiving a location data from a user mobile device.

15. The one or more non-transitory computer-readable storage media of claim 13, wherein identifying a current location of the user comprises:
   receiving a network address associated with a user mobile device.

16. The one or more non-transitory computer-readable storage media of claim 13, wherein identifying an alternate location having a reduced noise proximate to the current location comprises receiving data from a plurality of microphones.

17. A system comprising:
   a user interface;
   a microphone operable to detect a user speech and a background noise;
   a speaker;
   a network interface;
   one or more processors; and
   one or more memories storing one or more application programs executable by the one or more processors, the one or more application programs configured to process the background noise to identify whether a noise level threshold has been exceeded and output a noise level message to an audio device user, wherein the one or more application programs are further configured to transmit an event notification responsive to an identification the noise level threshold has been exceeded, the event notification operable to initiate identifying and reserving a location having a reduced background noise, the location comprising a meeting room, and wherein the one or more application programs are further configured to output a message at the user interface, the message comprising the meeting room.

18. The system of claim 17, wherein the noise level threshold corresponds to a noise reduction failure threshold level.

19. The system of claim 17, further comprising a plurality of stationary microphones disposed throughout a building structure.

20. The system of claim 17, wherein the one or more application programs are further configured to receive the message comprising the meeting room from a remote device.

21. The system of claim 17, wherein the noise level threshold corresponds to a user preference noise level threshold.

22. The system of claim 17, further comprising a dedicated background noise microphone arranged to detect the background noise.

23. The system of claim 17, wherein the one or more memories further comprise a voice prompt application operable to output a voice prompt to the audio device user indicating an alternate location having a reduced background noise.

* * * * *